Figure 1:
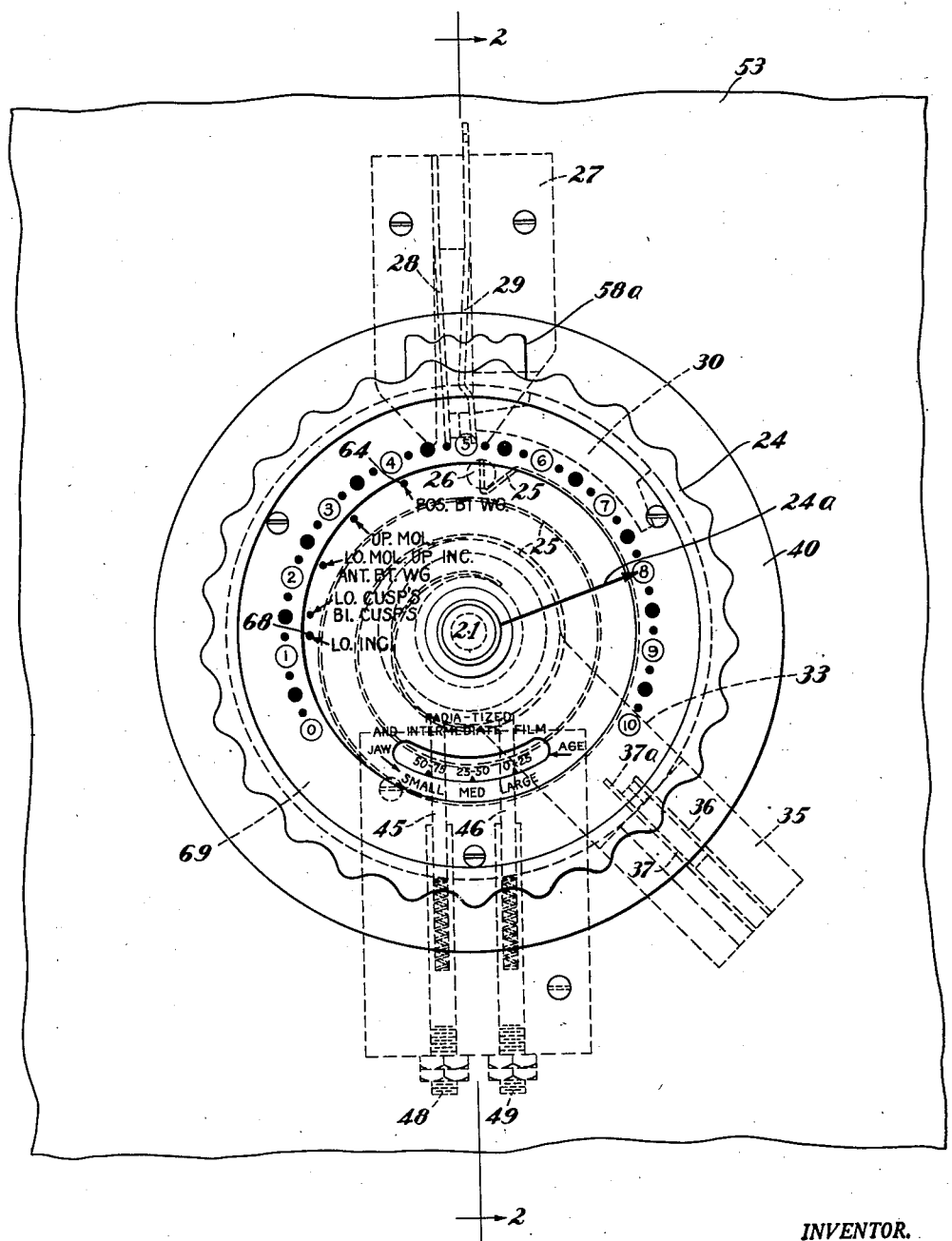

Aug. 19, 1952　　　　M. MORRISON　　　　2,607,414
APPARATUS FOR MEASURING TIME INTERVALS
Filed April 10, 1947　　　　　　　　　　3 Sheets-Sheet 1

INVENTOR.
MONTFORD MORRISON

BY D. Clyde Jones
ATTORNEY

Aug. 19, 1952 — M. MORRISON — 2,607,414
APPARATUS FOR MEASURING TIME INTERVALS
Filed April 10, 1947 — 3 Sheets-Sheet 2
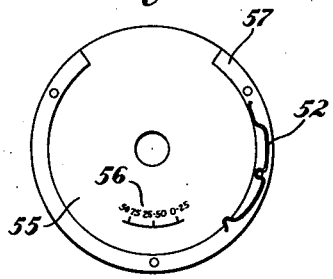
INVENTOR.
MONTFORD MORRISON
BY
D. Clyde Jones
ATTORNEY

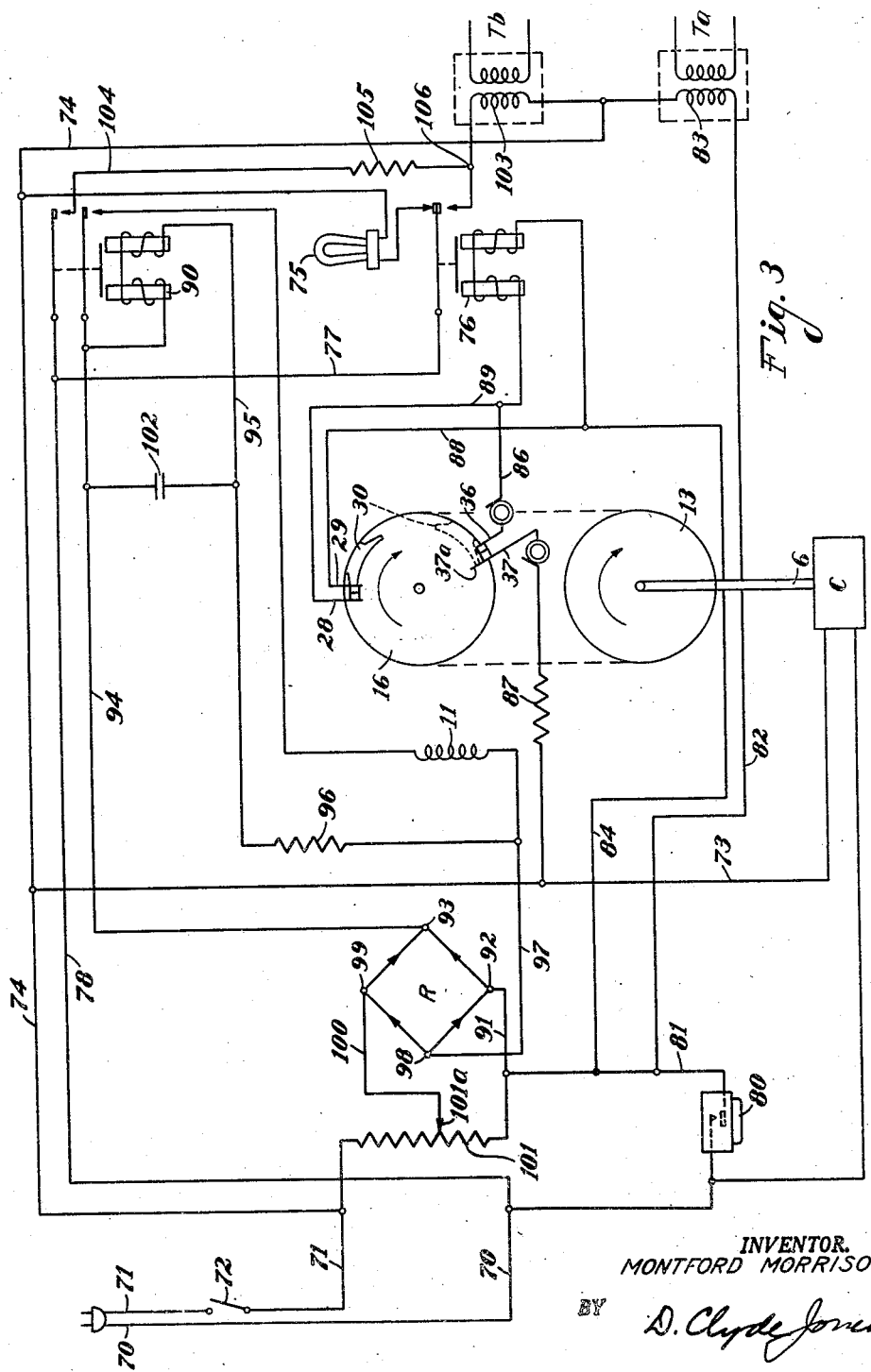

Patented Aug. 19, 1952

2,607,414

UNITED STATES PATENT OFFICE 2,607,414

APPARATUS FOR MEASURING TIME INTERVALS

Montford Morrison, Upper Montclair, N. J., assignor to Ritter Company, Inc., Rochester, N. Y., a corporation of Delaware Application April 10, 1947, Serial No. 740,691

9 Claims. (Cl. 161—1)

1

This invention relates to apparatus for measuring predetermined intervals of time.

In numerous technical fields, particularly in radiography, it is highly essential that a method and apparatus be provided so that various critical operations such as X-ray exposures, when initiated, will be continued for an accurately measured time interval and will then be terminated at exactly the end of this interval.

Many timing mechanisms have been designed to this end, but they have not attained the high degree of accuracy and reliability attainable by the present method and apparatus.

The various features and advantages of this invention will appear from the detailed description and claims when taken with the drawings in which:

Fig. 1 is a front view of the dial unit of the present invention;

Fig. 2 is for the most part a vertical section of the dial unit and the clutch taken generally on the line 2—2 of Fig. 1, a fragment of the clock which is shown at the left of this figure is not shown in section; Figs. 2A, 2B and 2C are detailed views on a reduced scale of several parts of the dial unit which are shown in assembled relation in Fig. 2; and Fig. 3 is a diagrammatic showing of the circuit arrangement and apparatus of this invention.

Referring first to Fig. 2, the timing apparatus of the present invention comprises an electric clock C, a dial unit generally designated D and a clutch CL for coupling the clock and the dial unit together for cooperative action. The clock with its electric motor and with its well known reduction gearing (not shown) are enclosed within a case 5. The clock is provided with a rotatable time shaft 6 which projects through the case and axially into the cylindrical magnetic clutch CL, fastened to the right hand surface of the clock case.

The clutch consists of a stationary ferromagnetic cup 7 having its partially closed end provided with a circular aperture in which there is secured a sleeve-like bearing support 8 of ferromagnetic material. The shaft 6 extends axially into the support 8 for rotation in thrust bearing 10 mounted in the sleeve. The cup 7 and support 8 define a recess to receive the stationary annular clutch-energizing coil 11 together with the insulating washers 12. A rotatable clutch plate or disc 13 of ferromagnetic material, which covers the open end of the cup, is provided with a hub 14 projecting into the cup to receive the threaded end of the shaft

2

6. The hub is locked against a shoulder on the shaft by the nut 15 so that the clutch disc 13 is rotated by the shaft throughout the period that the clock is operating. The clutch disc 13 cooperates with a second clutch plate or disc 16, which is rotatably mounted at the rear of dial unit D in slightly spaced relation with respect to clutch disc 13. A coil spring 18 mounted on the projecting portion of shaft 6, has its left end (Fig. 2) contacting the nut 15 and has its right end pointed to engage a center recess in the clutch disc 16. This insures that the clutch disc 16 will be disengaged from the clutch disc 13 except while the clutch coil 11 is energized. Disc 16 is made with a recessed hub 20 in which the left end of the dial shaft 21 is freely received so that each part can rotate independently of the other. The intermediate portion of shaft 21 is rotatably supported in a circular mounting plate 23, while the right hand end of this shaft has a transparent adjusting knob 24 secured thereto as will be further referred to. The clutch disc 16, when the clutch is disengaged at the conclusion of its forward rotation by the clock, is rotated in the reverse direction on shaft 21, back to its normal position, as shown, by means of the coiled spring 25 (Figs. 1 and 2). This spring has its inner end anchored to the hub 20 and has its outer end gripped in the split end of the pillar 26 (Fig. 2). Pillar 26 projects from the rear surface of the mounting plate 23 and has its right hand end riveted in an opening in that plate. At the rear surface of the mounting plate there is mounted a block 27 of electrical insulating material having fixed therein, contact springs 28 and 29 which are biased apart and which project adjacent the margin of the clutch disc 16. An arcuate lug 30 secured to the margin of disc 16 normally forces the contact spring 29 into engagement with contact spring 28, the springs serving with the lug 30 to limit the restoring movement of the disc 16 under the action of the coiled spring 25. The intermediate portion of the dial shaft 21 has secured thereto, a hub 31 of the time switch support which is rotatably adjustable by turning the knob 24. The hub 31, made of molded insulating material, is fastened to a metal facing 32 integral with shaft 21 to contact the rear surface of the mounting plate 23. The hub 31 has a radial arm 33 molded integral therewith, which is provided with the laterally projecting time switch block 35 of insulating material, integral with arm 33. This block carries the normally closed spring contacts 36 and 37 (Figs. 1 and 2), the latter having an extension 37a projecting into the path of the leading end of the arcuate lug 30. Thus, as the clutch disc 16 rotates to measure the desired time interval, it advances the lug 30 carried thereby until the leading end of this lug engages the extension 37a causing the time switch contacts 36 and 37 to be separated. This terminates the time interval as will be further set forth.

The hub 23 has a pair of peripheral rings 40 and 41 partially embedded therein, these rings being electrically connected to the contacts 36 and 37 respectively, by the conductors 42 and 43 embedded in the radial arm 33 and switch block 35. The rings 40 and 41 are contacted by the spring urged brushes 45 and 46 carried in the mounting block 47, screwed to the rear surface of the panel 53. The brushes are electrically connected to terminals 48 and 49 which project from the lower end of the mounting block for connection into the electrical circuits to be described.

On the front of the mounting plate 23, there is secured a raised escutcheon plate 50 provided with a peripheral flange 51. This flange enables the dial unit with its related clock and clutch mechanism to be supported on the panel 53. The escutcheon plate 50 is provided with a ledge 54 symmetrically located with respect to the margin of the plate. On this ledge, which extends parallel to the mounting plate 23, there is first assembled a fixed circular dial 55, centrally apertured to receive the shaft 21. On the lower part of the front of this dial, there appears a graduated scale 56 including three graduation marks for three different "age" settings corresponding to the age ranges indicated by the legends "0 to 25" years, "25 to 50" years and "50 to 75" years. An interrupted annular spacer 57 is superimposed on the margin of dial 55. Within this spacer there is nested an adjustable dial 58 having a central opening therein to receive the shaft 21 on which this dial has limited rotation. The dial 58 is provided with a radially extending handle 58a which projects through the interruption in the spacer. This interruption is of such length that handle 58a can rotate dial 58 through a substantial arc before engaging suitable stops. A spring catch 52 mounted on the spacer, engages notches in the edge of dial 58 to hold it in its adjusted position. In the lower part of dial 58, there is provided an arcuate shaped aperture 60 which exposes the previously mentioned graduated scale 56 and the "age" legends on the fixed dial 55. Index points 61, 62 and 63 project into the aperture from the adjacent portion of the rotary dial 58, to register with the respective graduations on the fixed dial. The index points 61, 62 and 63 are identified by the related legends "small," "medium," and "large," which refer to the jaw size of the patient to be X-rayed. The upper left-hand quarter of the rotary dial is marked with five graduation marks designated 64, 65, 66, 67 and 68 identified by certain legends (Fig. 1). These legends are Pos. Bt. Wg. (posterior bite wing); Up. Mol. (upper molar); Lo. Mol. (lower molar); Up. Inc. (upper incisor); Ant. Bt. Wg. (anterior bite wing); Lo. Cusp's (lower cuspids); Bi. Cusp's (bicuspids); and Lo. Inc. (lower incisors). A fixed annular dial 69 is secured coaxially on the spacer 57 to overlap the margin of the rotary dial 58. Dial 69 is uniformly graduated in units of time. It should be mentioned here that the transparent adjusting knob 24 on the outer end of the dial shaft 21, overlies the dial 69. Knob 24 has engraved thereon, a radially extending reference line or index 24a (Fig. 1) to sweep over the time graduations on dial 69 and also over the tooth position graduations on the rotary dial 58.

In the operation of the timer, a cord (Fig. 3) including conductors 70 and 71, is plugged into the commercial power leads (not shown) which are connected to a source of one hundred ten volt, sixty cycle alternating current. This cord has an ordinary toggle switch 72 connected therein. With this switch closed, operating current is supplied to the motor of the clock C, in a circuit extending from one side of the power source, conductor 70, winding of the clock motor, conductors 73, 74 and 71 to the other side of the current source. The motor immediately starts operating in this circuit, but since the clutch coil 11 is not energized at this time, no portion of the timing interval is measured. Also the closure of switch 72 completes a circuit for lighting the pilot light 75 which remains lighted throughout the time that the timer is in readiness for operation, but not during those occasions when the timer is measuring time intervals. During those intervals the pilot light is extinguished to indicate the duration of X-ray exposure. The lighting circuit extends from one side of the current source through conductors 71, switch 72, conductor 74, lamp 75, back contact and armature of relay 76, conductors 77, 78 and 70 to the other side of the current source.

When, however, a timing interval is to be measured, the technician, sets the dial unit D to the desired interval required for the exposure. The setting of the dial unit is effected in part by rotating the handle 58a and with it the rotary dial 58. Let it be assumed that the patient is in the age range from "50 to 75" years and that his jaw is "large." Then the dial 58 will be rotated until the index point 63 thereon, registers with that graduation on scale 56 which marks the range from "50 to 75" years. Thereafter, the knob 24 is rotated until its reference mark 24a is in registry with the appropriate graduation mark 64, 65, 66, 67, or 68 corresponding to the tooth or teeth to be X-rayed. The reference mark 24a will then point to one of the time graduations on the dial 69 to indicate the length of the time interval selected.

As a result of this turning of the knob 24 the dial shaft 2 rotates the time switch block 35 (Fig. 2), including spring contacts 36 and 37, to a selected position. The technician then depresses the push button switch 80 and holds it depressed, until the indicated time interval has been measured. On the depression of switch 80, the filament transformer Ta is energized from one side of the current source, conductor 70, contacts of push button switch 80, conductors 81 and 82, primary winding 83 of the filament transformer, conductors 74 and 71 to the other side of the current source. With this transformer connected in this circuit, the filament of the X-ray tube (not shown) is heated in readiness for use. Also, as soon as the push button 80 is depressed, a circuit is completed preparatory to operating the alternating current relay 76, the function of which will be hereinafter set forth. The circuit for the relay 76 is traceable from one side of the power source, conductor 70, push button 80, conductors 81 and 84, winding of relay 76, conductor 86, switch contacts 36 and 37 (now closed), resistor 87, conductors 73, 74 and 71 to the other side of the power source. Relay 76 does not operate at this time since it is short circuited by conductors 88 and 89 which are electrically connected together at this time, through contacts 28 and 29 (now closed).

The depression of the button 80, in addition, completes a direct current energizing circuit for operating sensitive relay 90 which in turn operates the clutch coil 11 to control the operation of the clutch CL. Clutch coil 11 couples the clutch disc 16 to the clutch disc 13 which is rotated by the timing motor or clock C. The circuit for relay 90 is traceable from the output terminal 93 of the bridge type selenium rectifier R, conductor 94, winding of relay 90, conductor 95, resistor 96, conductor 97, to the other output terminal 98 of the rectifier, the input of the rectifier being connected to the alternating current source by the depression of button 80. This input connection includes conductor 70 leading from one side of the current source, contacts of button 80, conductor 81, through the resistance element 101 of the voltage divider, and conductor 71 to the other side of the current source. The input terminal 92 of the rectifier is connected to the conductor 81 and to the resistance element 101 by the conductor 91, while the input terminal 99 of the rectifier is connected by the conductor 100 to the movable contactor 101a of the voltage divider. It will be noted that a capacitor 102 is connected in multiple with the winding of relay 90, the capacitor together with the resistor 96 constituting a time-delay unit, the time factor of which is determined by the characteristics of the elements thereof. The effect of this time-delay unit is to delay the energization of relay 90 until the filament of the X-ray tube (not shown) is heated, ready to function before the timer starts to measure the exposure interval. As soon as the relay 90 is operated, it closes an initial energizing circuit for the X-ray transformer Tb. This circuit is completed from one side of the source of current, conductors 70 and 78, armature and front contact of relay 90, conductor 104, through the limiting resistor 105, primary winding 103 of the X-ray transformer Tb, conductors 74 and 71, to the other side of the source of current. The resistor 105 passes sufficient current to energize the transformer Tb, although this current is but a small fraction of that applied to the transformer while the X-ray tube is functioning.

As soon as the relay 90 attracts its armatures it completes a circuit for the clutch coil 11 which circuit extends from one output terminal 98 of the rectifier R, conductor 97, coil 11, front contact and armature of relay 90, conductor 94 to the output terminal 93 of the rectifier. When coil 11 is thus energized, it causes the clutch disc 16 to engage the rotating clutch disc 13 so that both discs rotate together. As soon as the clutch disc 16 starts to rotate, its lug 30 disengages the switch springs 28 and 29, permitting them to separate. The separation of these switch springs interrupts the shunt or short-circuit which has prevented the relay 76 from operating in its prepared circuit, previously described. The interruption of this short circuit permits relay 76 to operate and thereby connect the terminal 106 of the primary winding of the X-ray transformer through the front contact and armature of relay 76, conductor 77 to conductor 78. This operation eliminates the limiting resistor 105 from the circuit of the primary winding 103. The clutch coil 11 remains energized so that the clutch disc 16, which engages the clutch disc 13 on the clock shaft 6, continues to rotate. This rotation is continued until the leading end of the lug 30 on the clutch disc 16 opens the switch contacts 36 and 37 which were positioned circumferentially by the rotation of the dial shaft 21 when the technician turned the knob 24 to the selected time interval. Immediately on the opening of the switch contacts 36 and 37, the relay 76 releases. At the front contact and armature of this relay, the energizing circuit for the X-ray transformer Tb is interrupted to terminate the X-ray exposure. However, at this time the primary winding 103 of the transformer is connected to the power source through the load resistor 105. At the back contact and armature of relay 76, the pilot light 75 is reconnected in its lighting circuit, so that it remains lighted until the relay 90 is released at the time when the technician stops pressing the push button 80. During the time that the clutch disc 16 was rotated as a result of the operation of the clutch coil 11, this clutch disc continued to wind up its restoring spring 25, but when the coil 11 releases, the spring 25 restores the clutch disc 16 to its normal position.

From the foregoing it will be understood that in the present timing method, the clutching operation is completely effected before the timing operation is started. Also, in this method the starting of the timing operation is effected by opening contacts in a circuit, instead of by closing them, thereby eliminating variations in the contact resistance which result when the timing operation is effected by closing contacts. The mentioned variation in the contact resistance is mainly due to bouncing of the contacts and variation in pressure between these contacts when the timing operation is started by circuit closure. It has been found in practice that the starting of the timing operation by opening of a circuit is considerably more accurate, where small currents are employed, than the common method in which the circuit is first closed to start the operation.

What I claim is:

1. In a timing apparatus, a clock having a rotatable time shaft, a clutch member driven by said shaft, a second clutch member having a normal rotational position, means operable at will for coupling said members together, a stationary switch and an adjustable switch in cooperative relation with said second clutch member, said adjustable switch being settable to various positions corresponding to various time intervals, an operation-controlling relay, an operating circuit for said relay completed at will and extending through said adjustable switch, a shunt about said relay closed through said stationary switch, and an element mounted on said second clutch member and effective only in the normal position thereof for closing said stationary switch and thereby shunting said relay, said element on the completion of the rotation of said second clutch member through the selected arc serving to open said adjustable switch and thereby interrupt said circuit.

2. In a timing system, an electric control circuit to be rendered effective for time intervals of various predetermined lengths, a uniform speed motor, a member rotatable through various arcs corresponding to different time intervals, a clutch for coupling said member to said motor for rotation thereby, a relay for completing said circuit, means for closing an operating circuit for said relay, a shunt normally connected across said relay for preventing the operation thereof, means responsive to the rotation of said member for opening said shunt, and means responsive to the rotation of said member through a selected arc for opening said operating circuit whereby said relay interrupts said control circuit.

3. In a timing apparatus, a clock having a rotatable time shaft, a clutch member driven by said shaft, a second clutch member spring-returned to a normal circumferential position, means operable at will for coupling said members together, a stationary switch cooperating with said second member, a switch settable to various positions around the periphery of said second member and corresponding to various time intervals, an operation-controlling relay, a circuit for said relay completed at will through said adjustable switch, a shunt about said relay closed through said stationary switch, and an element mounted on said second clutch member and effective only in the normal position thereof for closing said stationary switch and thereby shunting said relay, said element at the completion of the rotation of said second clutch member through the selected arc, serving to open said circuit.

4. In a timing apparatus, a clock having a rotatable time shaft, a clutch member driven by said shaft, a second clutch member adjacent said first member, an electrical clutch for coupling said members together, and a circuit for controlling said clutch completed at will, means including a resistor-capacitor delay unit connected in said circuit for delaying the effectiveness of said circuit for a given period following completion thereof.

5. In a timing system for electrical apparatus, a source of alternating current, a clock motor operated from said source, a filament transformer energized from said source, a primary clutch disc rotated by said motor, a secondary clutch disc adjacent said primary disc, a spring for rotating said secondary disc to a normal position of rest, a clutch coil for coupling said secondary disc to said primary disc, a rectifier having its input connected to said source to provide a pulsating direct current supply, a circuit including a sensitive relay energized from said supply, a manual switch for completing said circuit, an energizing circuit for said clutch coil completed from said supply by said relay, a stationary switch adjacent said secondary disc and comprising contacts biased to their open position, a normally closed adjustable switch rotatable to various positions around the periphery of said second disc depending on the length of a selected time interval, a transformer, a circuit for energizing said transformer from said source, a relay for completing said circuit, a circuit for said last mentioned relay connected to said source through said adjustable switch, a short circuit across said last mentioned relay completed by said stationary switch contacts, and an element carried by said secondary disc for normally closing said stationary switch contacts, said element when it has rotated through an arc corresponding to a selected time interval serving to open said adjustable switch whereby the last-mentioned relay releases to interrupt the energizing circuit from said source to said transformer.

6. In a timing system for electrical apparatus, a source of current, a clock motor operated from said source, a first transformer energized from said source, a primary clutch disc rotated by said motor, a secondary clutch disc adjacent said primary disc, a spring for rotating said secondary disc to a normal position of rest, a clutch coil for coupling said secondary disc to said primary disc, a circuit including a sensitive relay energized from said source, a manual switch for completing said circuit, an energizing circuit for said clutch coil completed from said source by said relay, a stationary switch adjacent said secondary disc and comprising contacts biased to their open position, a normally closed adjustable switch rotatable to various positions around the periphery of said second disc depending on the length of a selected time interval, a second transformer, a circuit for energizing said second transformer from said source, a relay for completing said circuit, a circuit for said last mentioned relay connected to said source through said adjustable switch, a shunt circuit across said last mentioned relay completed by said stationary switch contacts, and an element carried by said secondary disc for normally closing said stationary switch contacts, said element when it has rotated through an arc corresponding to a selected time interval serving to open said adjustable switch whereby the last-mentioned relay releases to interrupt the energizing circuit from said source to said second transformer.

7. In a timing system for electrical apparatus, a source of current, a clock motor operated from said source, a primary clutch disc rotated by said motor, a secondary clutch disc adjacent said primary disc, a spring for rotating said secondary disc to a normal position of rest, a clutch coil for coupling said secondary disc to said primary disc, a circuit including a sensitive relay energized from said source, a manual switch for completing said circuit, means for delaying the operation of said sensitive relay for a predetermined interval following the completion of its energizing circuit, an energizing circuit for said clutch coil completed from said source by said relay, a stationary switch adjacent said secondary disc and comprising contacts biased to their open position, a normally closed adjustable switch rotatable to various positions around the periphery of said second disc depending on the length of a selected time interval, a transformer, a circuit for energizing said transformer from said source, a relay for completing said circuit, a circuit for said last mentioned relay connected to said source through said adjustable switch, a shunt circuit across said last mentioned relay completed by said stationary switch contacts, and an element carried by said secondary disc for normally closing said stationary switch contacts, said element when it has rotated through an arc corresponding to a selected time interval serving to open said adjustable switch whereby the last-mentioned relay releases to interrupt the energizing circuit from said source to said transformer.

8. In a timing system, a uniform speed motor, an element settable at will to various positions related to different time intervals, a member rotatable from a condition of rest through various arcs corresponding to said different time intervals, a normally released clutch engageable at will for coupling said member to said motor whereby the member after a period of acceleration of the clutch and the member is rotated at the uniform speed of the motor, normally closed switching means opened by rotation of said member after the acceleration period is completed, for beginning the measurement of said interval, other switching means responsive to the rotation of said member through an arc corresponding to the setting of said element for terminating the measurement of said interval, and operation controlling means jointly governed by both of said switching means.

9. In a timing system, an electric control circuit to be rendered effective for time intervals of various predetermined lengths, a motor which accelerates from rest to a uniform speed in a given period following the starting thereof, a member rotatable through various arcs corresponding to different time intervals, an electric clutch energized at will for coupling said member to said motor for rotation thereby at a uniform speed following a period of acceleration of the member, normally closed primary switching means normally shunting said circuit but opened responsive to the rotation of said member for rendering said control circuit effective by removing said shunt, and other switching means responsive to the rotation of said member through a selected arc for rendering said circuit ineffective.

MONTFORD MORRISON.

REFERENCES CITED

The following references are of record in the file of this patent:

UNITED STATES PATENTS

| Number | Name | Date |
| --- | --- | --- |
| 1,235,261 | Waite | July 31, 1917 |
| 1,416,009 | Forshee | May 16, 1922 |
| 1,714,071 | Biles | May 21, 1929 |
| 1,888,809 | Shelton | Nov. 22, 1932 |
| 1,904,437 | Frederics | Apr. 18, 1933 |
| 1,919,980 | Hoffmann | July 25, 1933 |
| 2,126,957 | Goldfield | Aug. 16, 1938 |
| 2,143,692 | Haar | Jan. 10, 1939 |
| 2,270,531 | Kloos | Jan. 20, 1942 |
| 2,352,556 | Matthews | June 27, 1944 |
| 2,382,972 | Brune el al. | Aug. 21, 1945 |
| 2,388,686 | Habig | Nov. 13, 1945 |
| 2,401,289 | Morgan et al. | May 28, 1946 |
| 2,469,982 | Nemet et al. | May 10, 1949 |
| 2,479,922 | Gates, Jr., et al. | Aug. 23, 1949 |
| 2,486,866 | Morgan et al. | Nov. 1, 1949 |